United States Patent
Bachman et al.

(10) Patent No.: US 10,013,136 B2
(45) Date of Patent: Jul. 3, 2018

(54) USER INTERFACE, METHOD AND SYSTEM FOR CROWDSOURCING EVENT NOTIFICATION SHARING USING MOBILE DEVICES

(71) Applicants: Michael L Bachman, Long Beach, CA (US); Justin D Dionisio, Long Beach, CA (US)

(72) Inventors: Michael L Bachman, Long Beach, CA (US); Justin D Dionisio, Long Beach, CA (US)

(*) Notice: Subject to any disclaimer, the term of this patent is extended or adjusted under 35 U.S.C. 154(b) by 204 days.

(21) Appl. No.: 13/630,857

(22) Filed: Sep. 28, 2012

(65) Prior Publication Data

US 2013/0275880 A1 Oct. 17, 2013

Related U.S. Application Data

(60) Provisional application No. 61/541,043, filed on Sep. 29, 2011.

(51) Int. Cl.
| | |
|---|---|
| *G06F 3/0481* | (2013.01) |
| *G06F 3/0488* | (2013.01) |
| *G06F 17/30* | (2006.01) |
| *G06Q 50/00* | (2012.01) |
| *G09B 29/00* | (2006.01) |
| *H04L 29/08* | (2006.01) |
| *H04M 3/493* | (2006.01) |
| *G06Q 10/10* | (2012.01) |

(52) U.S. Cl.
CPC .......... *G06F 3/0481* (2013.01); *G06F 3/0488* (2013.01); *G06F 17/30017* (2013.01); *G06Q 10/10* (2013.01); *G06Q 50/01* (2013.01); *G09B 29/003* (2013.01); *H04L 29/08657* (2013.01); *H04M 3/493* (2013.01)

(58) Field of Classification Search
CPC ............................... G06F 3/0481; G06F 15/16
USPC .......................................................... 715/751
See application file for complete search history.

(56) References Cited

U.S. PATENT DOCUMENTS

| | | | |
|---|---|---|---|
| 2009/0254840 A1* | 10/2009 | Churchill et al. ............ | 715/753 |
| 2011/0004501 A1* | 1/2011 | Pradhan et al. .................. | 705/8 |
| 2011/0143776 A1* | 6/2011 | Shankaranarayanan et al. .......................... | 455/456.3 |
| 2013/0018685 A1* | 1/2013 | Parnaby ................. | G06Q 10/10 705/7.13 |
| 2013/0096981 A1* | 4/2013 | Evans et al. ................. | 705/7.29 |

* cited by examiner

*Primary Examiner* — Andrea Leggett
(74) *Attorney, Agent, or Firm* — Sandra P. Thompson; Finlayson, Toffer, Roosevelt & Lilly LLP

(57) ABSTRACT

Accessible user interface applications for crowdsourced notification and sharing of events are disclosed that include: at least one piece of multimedia information content that is related to an at least one event, experience or combination thereof, at least one mapped geographical location that is related to the at least one event, experience or combination thereof, wherein the at least one piece of multimedia information content and the at least one mapped geographical location are collected by the accessible user interface application and converted into a crowd sourced social map; and a mobile device, wherein the accessible user interface is stored on, located on, shown by, accessed by the user from or a combination thereof. Related methods and systems are also disclosed herein.

20 Claims, 15 Drawing Sheets

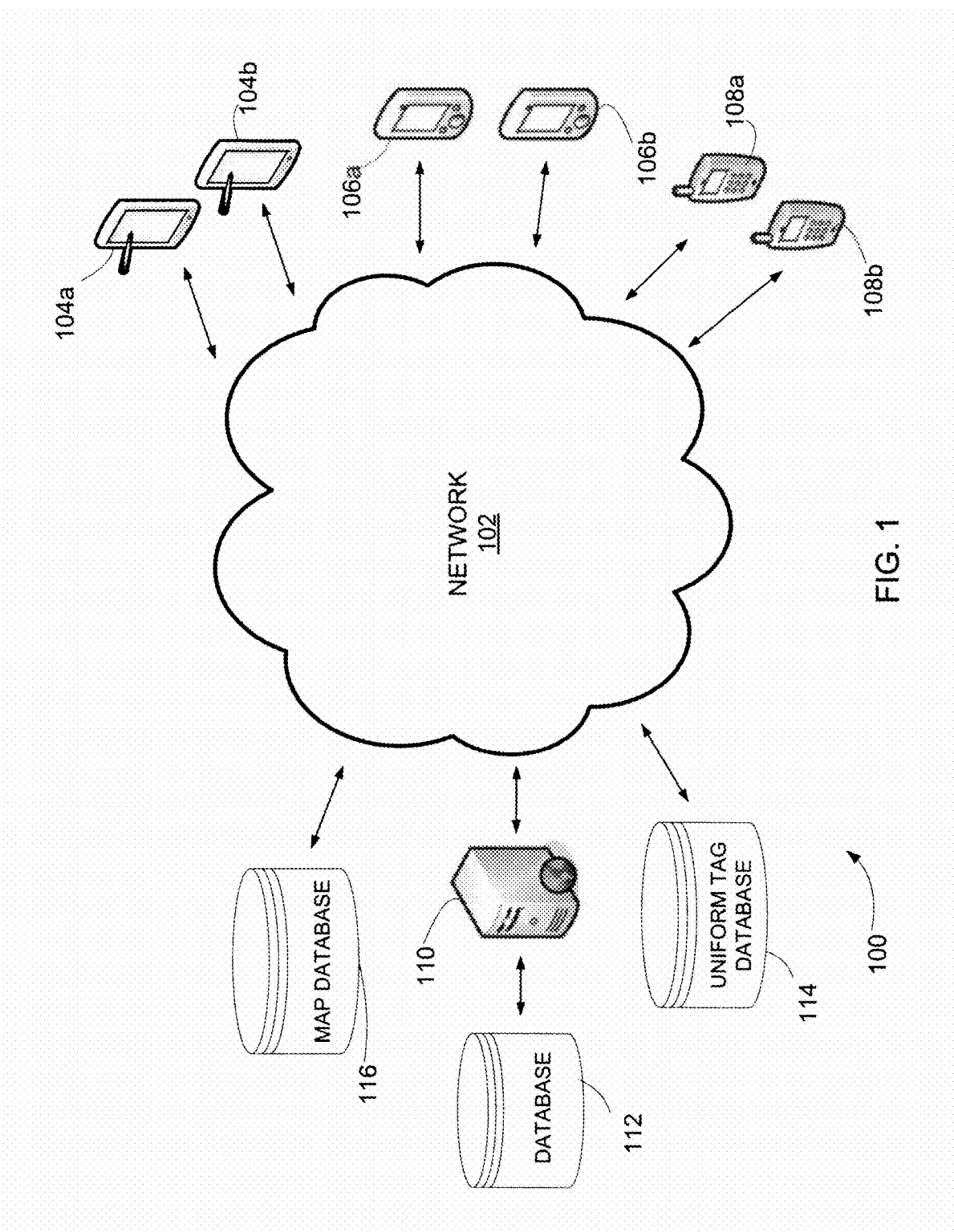

USER INTERFACE, METHOD AND SYSTEM FOR CROWDSOURCING EVENT NOTIFICATION SHARING USING MOBILE DEVICES

This U.S. Utility Application claims priority to U.S. Provisional Application Ser. No. 61/541,043 entitled "User Interface, Method and System for Crowdsourced Event Notification Sharing Using Mobile Devices" that was filed on Sep. 29, 2011, is commonly-owned and incorporated herein in its entirety by reference.

FIELD OF THE SUBJECT MATTER

The present disclosure relates generally to the field of electronic information processing, and in particular but not exclusively, relates to a user interacting with a user interface, along with methods and systems for actively capturing and intelligently categorizing multimedia informational content from users of mobile devices pertaining to their interactions with events and experiences and for displaying postings pertaining to these events and experiences in mapped geographic locations on the user interface of a mobile application executing on the mobile devices.

BACKGROUND

The rapid evolution of the Internet has seen an explosion of applications that are designed to provide users with a vast array of information in real time or on the spot. The emergence of a "mobile web" that can provide access to information regardless of the location of a person has allowed the Internet and its vast resources to be taken virtually anywhere in the world. However, in providing greater access to information in a location-independent manner, it has become increasingly difficult for individual users to understand what events may be occurring in areas near their present locations that may be of interest at any given moment in time.

Interactive services, such as Twitter™ or Facebook™, allow individual people to be "followed" throughout a given day. Also, various applications exist to track assets and resources in different geographic locations. In short, it is possible to follow someone or something, but not commonly easy to follow events and relevant experiences somewhere. For example, you can set up an event in Facebook™, but only those "invited" to the event will see comments about the event. On Twitter™, you can follow an event, as long as everyone remembers to use a particular hashtag and/or search for that hashtag and read all of the posts. Some Internet services have attempted to address this problem in the past, but have not successfully addressed the immediate challenge of creating a real-time snapshot of a user experience on either mobile or desktop device without over cluttering a user interface with media posts or other informational content.

As an example, the Google™ Buzz application once attempted to provide information on new and relevant happenings in different locations, but failed in this effort because it did not provide adequate individual privacy protections and was generally more of a user social network; and, therefore was not a source of helpful, or in some instances any, information for those who desired access to user feedback on events and experiences immediately proximate to their present locations. Thus, it did not adequately address location as a central focus for identifying relevant events and experiences for any given user. On a related note, CNN tried in vain to enlist its viewers to provide content using its I-Reporter platform, but failed in its efforts since it could only broadcast isolated incidents, not compile data en masse in any meaningful manner on localized user events and experiences that were generally proximate to their location.

Thus, a clear need exists for a user interface, method and system that can: a) capture, categorize and display relevant events and experiences of users in any given geographic location, b) without presenting an overly cluttered view of this information in a dynamic manner, c) on the wide array of mobile devices which are currently being used, and d) and doing so without privacy considerations or restrictions. These events and experiences can also be combined and organized as a "crowd sourced social layer" upon a geographic map so that end-users can readily view content associated with these events and experiences as a "social map" providing enhanced content relevance which can be easily viewed and searched.

BRIEF DESCRIPTION OF THE FIGURES

FIG. 1 is a block diagram illustrating an operating environment for a mobile application in an embodiment.

DETAILED DESCRIPTION

Figure 2A:
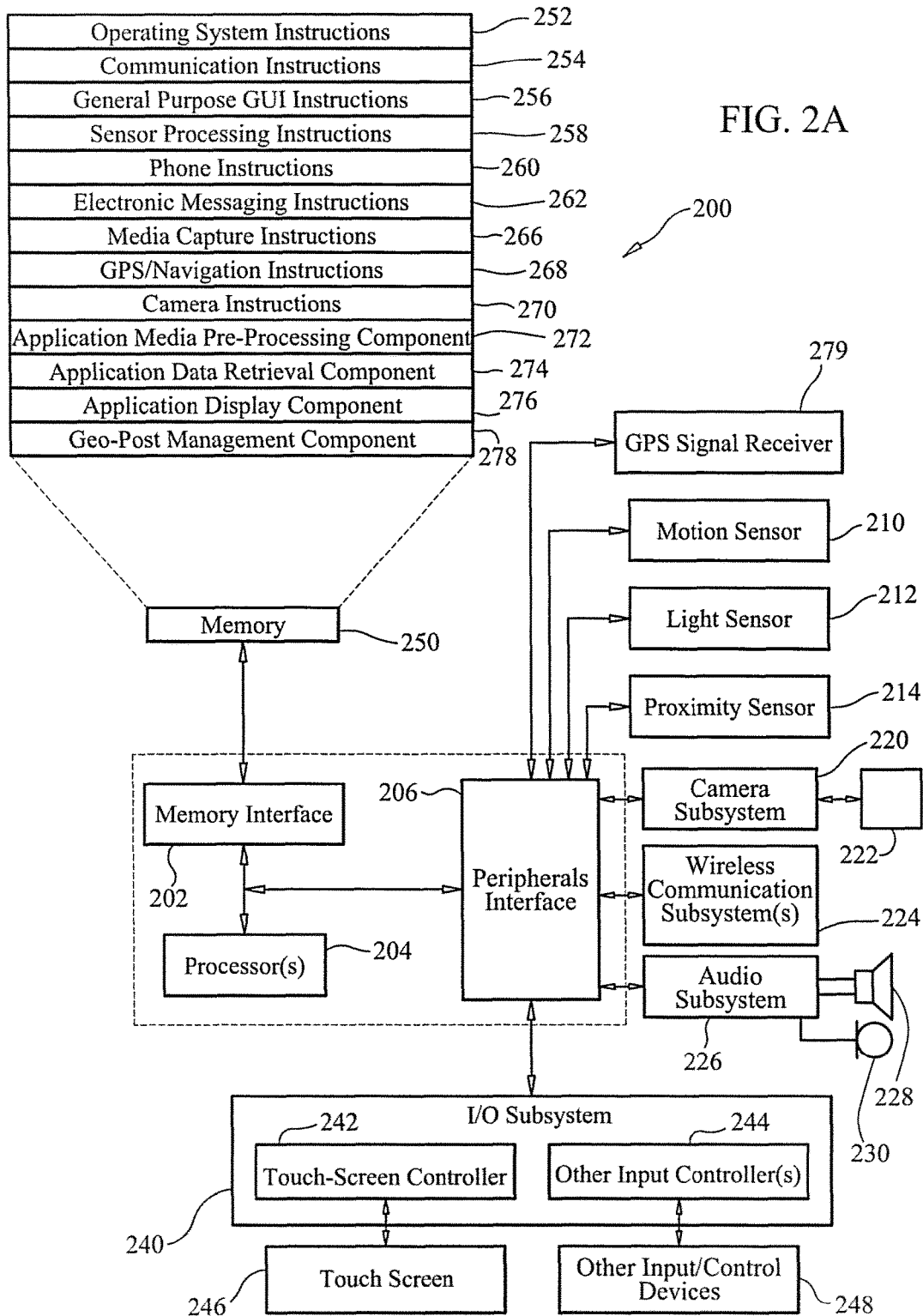
FIG. 2A is a block diagram illustrating the operative instructions and components of a mobile device in an embodiment.

A user interface, method and system has been developed that can: a) capture, categorize and display relevant events and experiences of users in any given geographic location, b) without presenting an overly cluttered view of this information in a dynamic manner, c) on the wide array of mobile devices which are currently being used, and d) and doing so without privacy considerations or restrictions. These events and experiences can also be combined and organized as a "crowd sourced social layer" upon a geographic map so that end-users can readily view content associated with these events and experiences as a "social map" providing enhanced content relevance which can be easily viewed and searched.

Specifically, an accessible user interface application for crowdsourced notification and sharing of events is disclosed that comprises: at least one piece of multimedia information content that is related to an at least one event, experience or combination thereof, at least one mapped geographical location that is related to the at least one event, experience or combination thereof, wherein the at least one piece of multimedia information content and the at least one mapped geographical location are collected by the accessible user interface application and converted into a crowd sourced social map; and a mobile device, wherein the accessible user interface is stored on, located on, shown by, accessed by the user from or a combination thereof.

In addition, a method of using accessible user interface for crowdsourced notification and sharing of events is disclosed that comprises: having at least one event, experience or combination thereof, wherein the at least one event, experience or combination thereof is attended by at least one person, providing at least one piece of multimedia information content that is related to an at least one event, experience or combination thereof, providing at least one mapped geographical location that is related to the at least one event, experience or combination thereof, wherein the at least one piece of multimedia information content and the at least one mapped geographical location are collected by the accessible user interface application and converted into a crowd sourced social map; providing a mobile device, wherein the accessible user interface is stored, located, shown, accessed by the user from or a combination thereof; and utilizing the mobile device to access the accessible user interface.

Also, systems for utilizing an executable accessible user interface application for crowdsourced notification and sharing of events are disclosed that include: at least one piece of multimedia information content that is related to an at least one event, experience or combination thereof, at least one mapped geographical location that is related to the at least one event, experience or combination thereof, wherein the at least one piece of multimedia information content and the at least one mapped geographical location are collected by the accessible user interface application and converted into a crowd sourced social map; and a mobile device having at least one storage medium, wherein the accessible user interface is stored on the storage medium, located on the storage medium, shown by the mobile device, accessed by the user from the storage medium or a combination thereof.

FIG. 1 is a block diagram 100 illustrating the operating environment for a mobile device application for crowdsourced event notification. The term "crowdsourcing" refers generally to an open call to an undefined and unrelated group of people who are (i) most fit to perform tasks, (ii) solve problems, and (iii) contribute the most relevant and fresh ideas. In the present content, this term means and generally refers to the sourcing of content posts and associated tags that identify events or document user experiences for viewing by others who may deem the postings and associated tags as relevant to their personal interests and needs.

FIG. 1 shows a contemplated embodiment shown by a block diagram 100 that includes a network 102 and multiple mobile devices which communicate over the Network 102 to one or more computer servers. In one embodiment, the Network 102 is the Internet. As shown, mobile devices such as Tablet Computers 104a, 104b, Personal Digital Assistant (PDA) 106a, 106b, and Smartphones 108a, 108b are communicatively coupled over the Network 102 to the computer servers. Specifically, a mobile application executing on each mobile device communicates over Network 102 to a Web Server 110, one or more database servers which store a Uniform Tag Database 114 and one or more database servers which store a Map Database 116. In one embodiment, the Web Server 110 is communicatively coupled to a Database 112 which is resident on a database server. The Database 112 stores multiple tables, including a table for storing content posts, a table for storing tags associated with each content post, at least one table for storing textual content, at least one table for storing photo content, and at least one table for storing video content.

The contents stored in the Database 112 are generated by users of the mobile devices on which the mobile application executes. In an embodiment, the Map Database 116 comprises any suitable mapping software, map database, mapping program or combination thereof, and specifically in this contemplated embodiment is the Google Maps database provided by Google, Inc. on which geographic maps are stored for various locations around the world. The Uniform Tag Database 114 stores uniform versions of tags for content posts which can be used to identify events at various geographic locations on the geographic map generated on the mobile devices from use of the Map Database 116.

The Uniform Tag Database 114 is stored on one or more database servers and is accessed through an open application programming interface (an "Open API") that interoperates with a software-implemented data retrieval component of a mobile application executing on each mobile device. The Open API is used by the data retrieval component of the mobile application to access and retrieve data from the Uniform Tag Database 114. In one embodiment, the Uniform Tag Database 114 is a database compiled and maintained by Foursquare Labs, Inc. and includes tags which have been provided by users of other applications to mark and identify specific events or user experiences at different geographic locations.

FIG. 2A is a block diagram 200 illustrating an implementation of a mobile device 104, 106, 108 of FIG. 1. The mobile device 104, 106, 108 can include a memory interface 202, one or more data processors, image processors and/or central processing units 204, and peripherals interface 206. The memory interface 202, the one or more processors 204 and/or the peripherals interface 206 can be separate components or can be integrated in one or more integrated circuits. The various components in each mobile device 104, 106, 108 can be coupled by one or more communication buses or signal lines.

Sensors, devices, and subsystems can be coupled to the peripherals interface 206 to facilitate multiple functionalities. For example, motion sensor 210, light sensor 212, and proximity sensor 214 can be coupled to the peripherals interface 206 to facilitate orientation, lighting, and proximity functions. A GPS Signal Receiver 216 is also included that can connect to the peripherals interface 206 as part of a position location system. The receiver 216 generates geographic coordinates which are transmitted to the Web Server 110 to enable it to properly generate map views on for proper display in the user interface on each mobile device.

Camera subsystem 220 and optical sensor 222 (e.g., a charge-coupled device (CCD) or a complementary metal-oxide semiconductor (CMOS) optical sensor), can be utilized to facilitate camera functions, such as the recording of photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication networks over which the mobile devices 104, 106, 108 are intended to operate. For example, a mobile device 104, 106, 108 may include communication subsystems 224 designed to operate over a GSM network, a GPRS network, an EDGE network, a WiFi or WiMAX network, and a Bluetooth™ network. Audio subsystem 226 can be coupled to speaker 228 and microphone 230 to facilitate voice enabled functions, such as voice recognition, voice replication, digital recording, and telephony functions.

The I/O subsystem 240 can include touchscreen controller 242 and/or other input controllers 244. The touchscreen controller 242 can be coupled to touchscreen 246. The touchscreen 246 and touchscreen controller 242 can for example detect contact and movement or breaks thereof using any of a plurality of touch sensitivity technologies, including but not limited to capacitive, resistive, infrared, and surface acoustic wave technologies, as well as other proximity sensor rays or other elements for determining one or more points of contact with the touchscreen 246. The other input controllers 244 can be coupled to other input/control devices 248, such as one or more buttons, rocker switches, a thumbwheel, an infrared port, a USB port, and/or a pointer device such as a stylus. The one or more buttons (not shown) can include an up/down button for volume control of speaker 228 and/or the microphone 230.

In one contemplated embodiment, a pressing of a button for a first duration may disengage a lock of a touchscreen 246. And, a pressing of the button for a second duration that is longer than the first duration may turn power to the mobile device 104, 106, 108 on or off. The user may also customize the functionality of one or more of the buttons. The touchscreen 246 can, for example, be used to implement virtual or soft buttons and/or a keypad or keyboard.

In some contemplated embodiments, the mobile device 104, 106, 108 can present recorded audio and/or video files, such as MP3, AAC, and MPEG files. In other implementations, the mobile device 104, 106, 108 can include the functionality of an MP3 player, such as an iPod. The mobile devices 104, 106, 108 may, therefore, include a 30-pin dock connector that is compatible with the iPod. Alternative input/output and control devices can also be used.

In contemplated embodiments, the memory interface 202 is coupled to memory 250. The memory 250 includes high speed random access memory and/or nonvolatile memory, such as one or more magnetic disk storage devices, one or more optical storage devices and/or flash memory (e.g., NAND, NOR). The memory 250 can store instructions for an operating system 252 such as Darwin, RTXC, LINUX, UNIX, OS X, WINDOWS, or an embedded operating systems such as VxWorks. The operating system instructions 252 may also include instructions for handling basic system services and for performing hardware dependent tasks.

The memory 250 also stores communication instructions 254 to facilitate communicating with one or more additional devices, one or more computers and/or one or more servers. The memory 250 includes general purpose graphical user interface instructions 256 to facilitate graphic user interface processing. For example the graphical user interfaces described with respect to FIGS. 3-7G can be implemented with general purpose graphical user interface instructions 256. The memory 250 can also include sensor processing instructions 258 to facilitate sensor related processing and functions, phone instructions 260 to facilitate phone related processes and functions; electronic messaging instructions 262 to facilitate electronic messaging related processes and functions; media capture instructions to facilitate the capture of image and video content; GPS/Navigation instructions 268 to facilitate GPS and navigation related processes and instructions; and camera instructions 270 to facilitate camera-related processes and functions.

In addition to the system level instructions stored in the memory 250, the several core components of the mobile application are stored in the memory 250 and executed on the processor 204 when invoked by a user of the mobile device 104, 106, 108. The operative components of the mobile application include an Application Media Pre-Processing Component 272 for preliminary processing the photo and video content captured using the mobile capture instructions 266; an Application Data Retrieval Component 274 for retrieving map data from the Map Database 116, uniform tags from the Uniform Tag Database 114 and stored custom tags and content posts from the Database 112 for display in the user interface of the mobile device 104, 106, 108; an Application Display Component for displaying the content posts and associated tags on a user-selected "map view" for a desired geographic area and for displaying the listings of the content stored by users of the mobile application in a "list view," which content can include textual content, photo content and video content.

The mobile application also includes a fourth component, a Geo-Post Management Component 278 for use in capturing and queuing content posts for storage in the Database 112, for transmitting a tag list for each post to the Web Server 110 for storage in the Database 112, for transmitting to the Web Server 110 the GPS coordinates of the mobile device 104, 106, 108, and for transmitting to the Web Server 110 the two-dimensional minimum and maximum map coordinates of the current map view displayed on the user interface of the mobile device 104, 106, 108.

Each of the above-identified instructions and applications can correspond to a set of functions for performing one or more of the functions described above. These instructions may not be implemented as separate software programs, procedures, or modules. The memory 250 can include additional instructions or fewer instructions. Furthermore, various functions of the mobile device 104, 106, 108 may be implemented in hardware and/or in software, including in one or more signal processing and/or application specific integrated circuits.

Figure 2B:
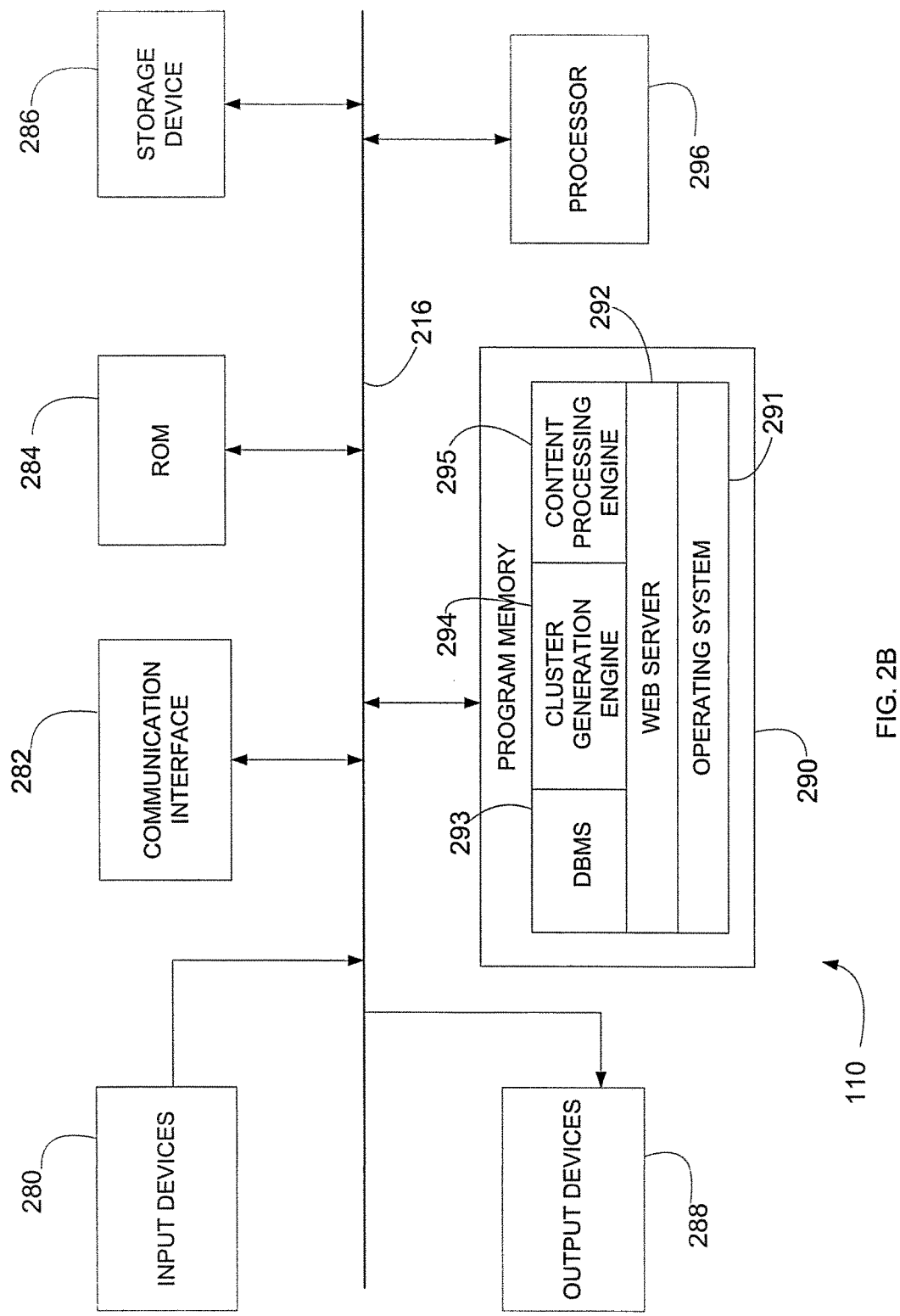
FIG. 2B is a block diagram illustrating the operative components of a web server in an embodiment.

FIG. 2B is an illustration of a contemplated embodiment for the Web Server 110, as shown in FIG. 1. The Web Server 110 includes a communication bus 216, one or more input devices 280 such as a keyboard or headset with microphone, a communication interface 282, a Read-Only Memory (ROM) 284, and a secondary storage device 286, all of which are communicatively coupled to each other through the communication bus 216. These devices interact with a central processor 296 and program memory 290 to implement back-end processing for input received from the mobile devices 104, 106, 108. The Web Server 110 also includes one or more output devices 288 which may include a CRT (cathode ray tube) or LCD (liquid crystal display) for displaying information to the user. The program memory 290 stores and enables the execution of several software components for implementation of back-end processing capabilities in support of the mobile application executing on the mobile devices 104, 106, 108. An operating system 291 is provided to facilitate the handling of basic system services and for performing various hardware dependent tasks on the Web Server 110.

A Web Server Software Component 292 facilitates execution of requests from the mobile application residing and executing on the mobile devices 104, 106, 108. The Web Server Software Component 292 in one embodiment is used to store and retrieve content posts, custom tags, and the associated content including textual content, photo content and video content comprising a content post in the Database 112 using the database management system (DBMS) 293. The Web Server Software Component 292 executes a scripting language, such as a Hypertext Pre-Processor (PHP), to format the content for each post so that it can be properly displayed on a geographic map within a user's selected map view on the interface of each mobile device 104, 106, 108. The clustering of posts shown in the geographic locations on a map provided from the Map Database 116 adds a cohesive "social layer" of content onto a geographic map displayed in the user interface on a mobile device 104, 106, 108. In one embodiment, the Database Management System (DBMS) 293 uses a structured query languages, such as PostgreSQL, for storing and retrieving data to and from the Database 112. The data stored in the Database 112 includes stored tables consisting of content posts and uniform or custom tags associated with content post for use in tracking posts and determining the popularity of tags for associated textual content, photo content and video content. Associations between each post and associated tags and related content are maintained in stored tables in the Database 112 to ensure that each tag is associated with the appropriate content post and that the correct content is associated with the right post. In one embodiment, up to four user-selected tags can be associated with a single content post.

The cluster generation engine 294 is used to facilitate the grouping or clustering of content posts within a certain geographic proximity and shown on a user's selected map view displayed in the user interface of the mobile device 104, 106, 108. This cluster generation engine 294 evaluates the latitudinal/longitudinal geographic location of each content post and clusters content posts together within a given geographic proximity so that all content posts and their associated tags are made available for display to users of the mobile application while executing on their mobile devices 104, 106, 108. The user interface for each mobile device 104, 106, 108 dynamically adjusts the clustering of content posts depending on the map view selected by a user of the application.

The cluster generation engine 294 tracks map view coordinates provided from the Geo-Post Management Component 278 operating on each mobile application and dynamically adjusts the clustering of content posts shown to a user for a given map view. In one embodiment, the proximity parameter used for clustering content posts may be any suitable geographic limit, depending on available technology and specific needs of the cluster generation engine. In some contemplated embodiments, the proximity parameter used imposes a one mile geographic limit. Thus, in this contemplated embodiment, all content posts within one mile of all other content posts can be clustered together and made available for viewing within a user's selected map view. In viewing the content, the user may view all textual content, photo content and video content associated with each post in one or more clusters in a geographic area depending on the selected map view.

The content processing engine 295 is used to provide enhanced content processing for photo content and video content including the optimized scaling and compression of photos and videos to enhance their size and quality for use in thumbnails shown on the user displays of the mobile devices 104, 106, 108. In one embodiment, photo content can be down converted in three different sizes: small, medium and large. More specifically, photo content which is 1280×960 pixels can be down converted to 640×480 pixels, 480×360 pixels, or 320×240 pixels. Video content can be used to generate thumbnails from the first video frame, the last video frame and two frames randomly selected between the first and last video frames. Video conversion involves the use of video codecs which implement the H.264 standard. In one embodiment, small thumbnails from video are produced which result in video thumbnails of 240×160 pixels. A larger thumbnail which also implements the H.264 standard produces a video thumbnail with 480×320 pixels.

Figure 3:
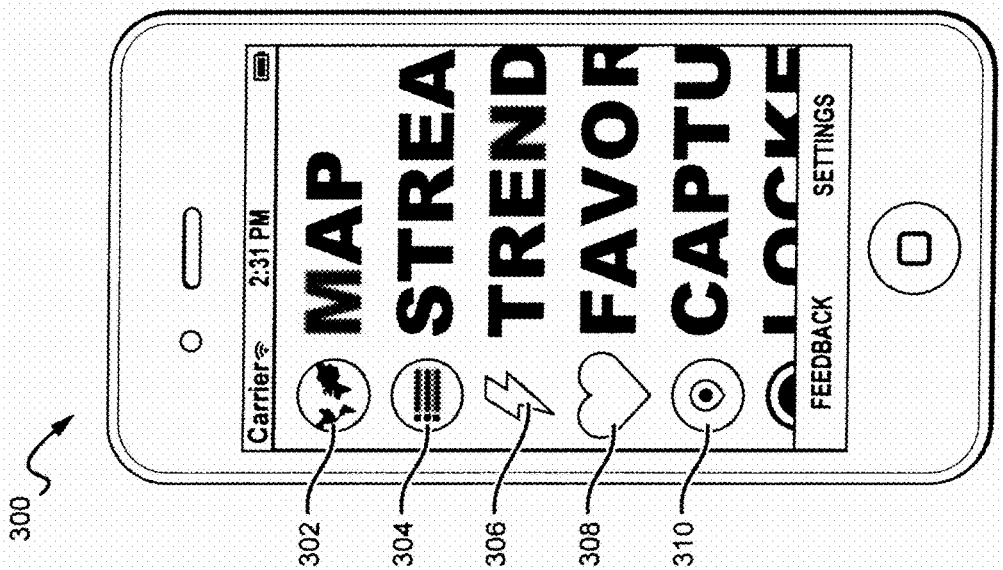
FIG. 3 is a display diagram illustrating a user interface of a mobile application for event notification sharing in an embodiment.

FIG. 3 is an illustration of a contemplated home screen 300 of the mobile application as it executes on a mobile device 104, 106, 108 in one embodiment. In this embodiment, the mobile device is a smartphone 108. As shown, the mobile application includes a map generation function 302, a streaming video function 304, a trend identification function 306, a favorites listing of tags 308, and a content posting function 310 for capturing new content. The application would be downloaded from the Apple iTunes store or the Google Market and then invoked by a user. This home screen 300 is the first screen seen by users of the mobile application once it is invoked in this embodiment, however, it should be understood that the home screen may be any suitable introduction screen, including a map, an advertisement or a combination thereof.

Figure 4A:
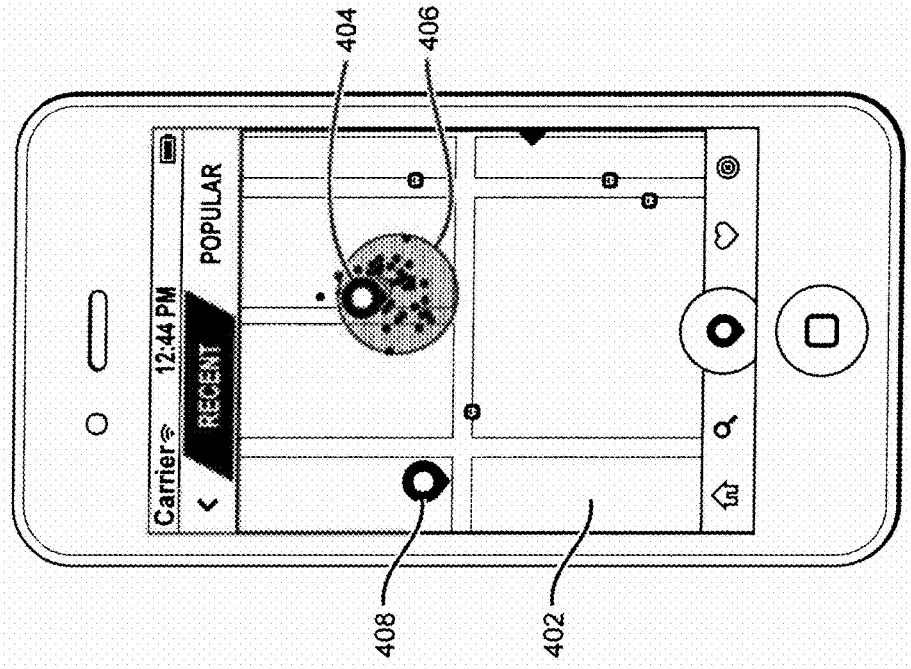
FIG. 4A is a display diagram illustrating a user interface of a mobile application for event notification sharing in an embodiment.

FIG. 4A illustrates a user interface 402 showing two "hot spots," a first hot spot 408 and a second hot spot 404. This user interface 402 also shows a "hot spot cluster" 406 covering several content posts within a defined geographic area. The small dots within the cluster on the user interface 402 represent individual content postings by end users of the mobile application. The content posts are generated by all users of the mobile application and therefore enable a "social layer" of content viewing on a map to thereby give rise to a crowdsourced view of events in different geographic locations which are available for viewing depending on a user's current map view.

Figure 4C:
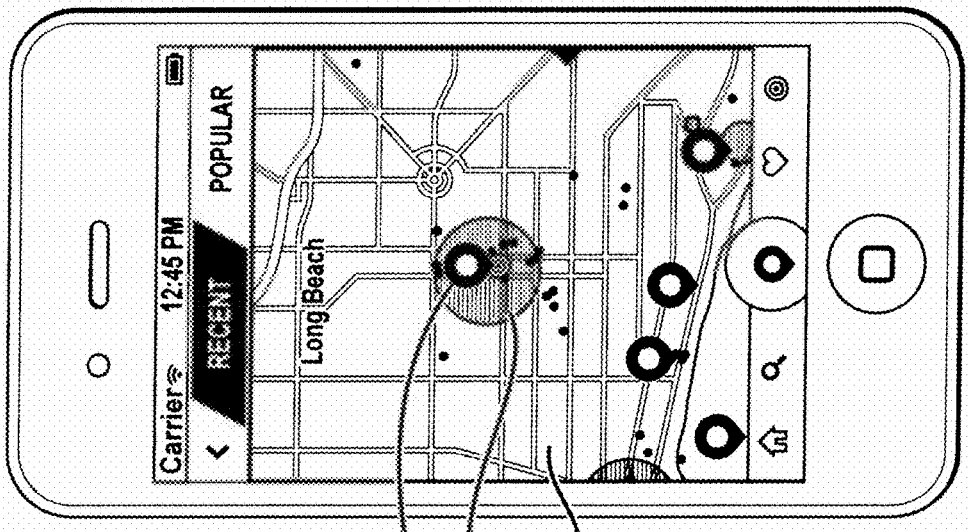
FIG. 4B is a display diagram illustrating a user interface of a mobile application for event notification sharing in an embodiment.
FIG. 4D is a display diagram illustrating a user interface of a mobile application for event notification sharing in an embodiment.
FIG. 4E is a display diagram illustrating a user interface of a mobile application for event notification sharing in an embodiment.
FIG. 4F is a display diagram illustrating a user interface of a mobile application for event notification sharing in an embodiment.
Figure 4B:
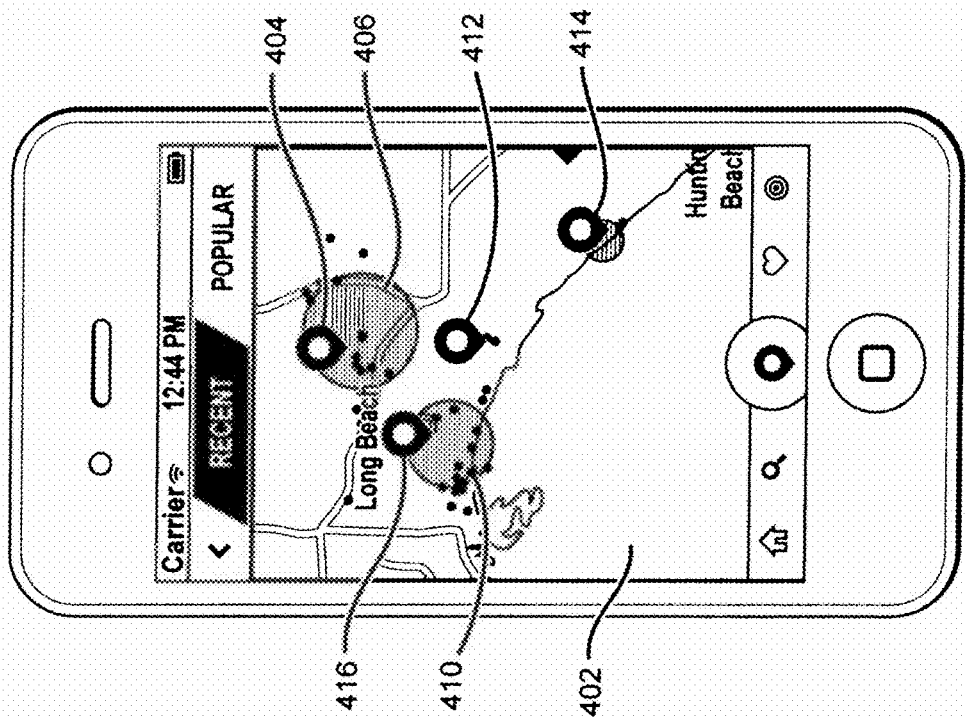

FIG. 4B illustrates a map view showing additional hot spots in a view that is generated once a user zooms out from the view provided in FIG. 4A. In the user interface 402, four hot spots are shown, 404, 416, 412, 414. Two "hot spot clusters" 406, 410 are shown in this map view.

FIG. 4C is yet another illustration of the user interface 402 showing additional hot spots and hot spot clusters. Specifically, hot spot 404 and hot spot cluster 406 are shown centered on the user's current geographic location. The geographic location of the current user is represented by the circle at the base of the hot spot 404. As shown in this user interface 402, multiple content posts are shown which have been made by users of the application who are noting specific events and experiences they have had or encountered in the geographic region shown in the current user's currently selected map view on this Smartphone.

Figure 4E:
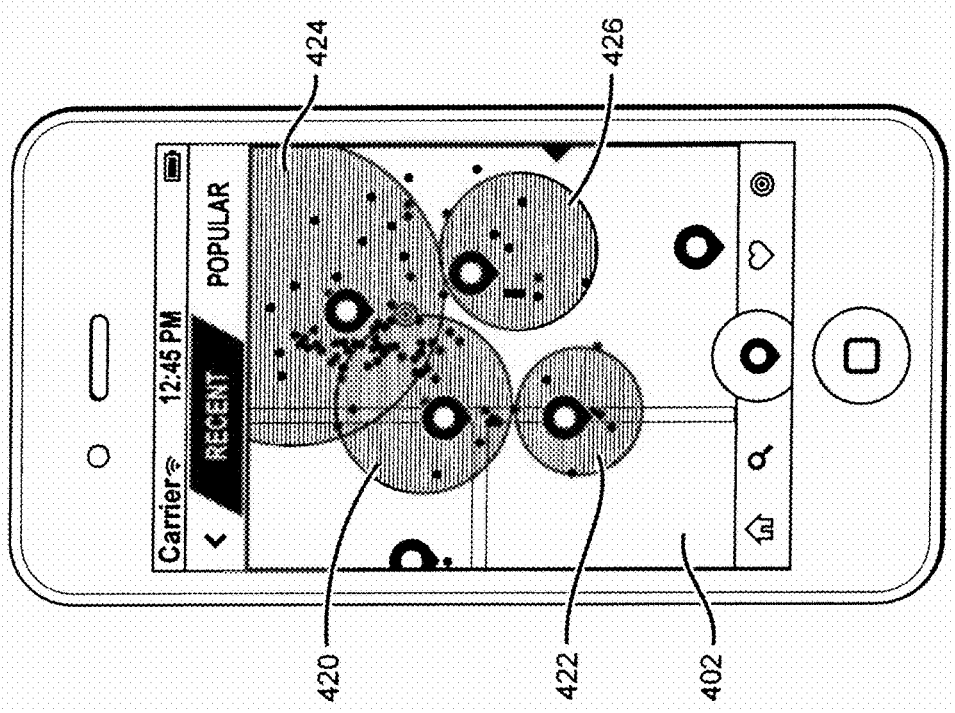
Figure 4D:
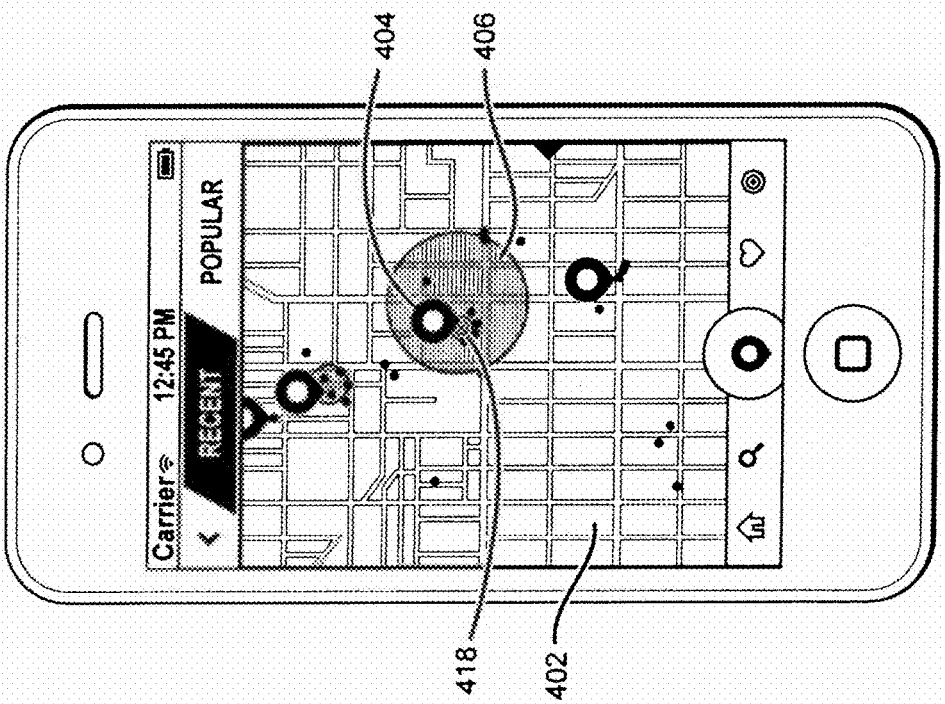

FIG. 4D shows a further zoom-in of the cluster shown in FIG. 4C. In this map view, hot spot 404 is shown and hot spot cluster 406 is shown in greater detail relative to nearby individual streets in the geographic location representing the user's current map view. The user's current location 418 is marked by a circle within the hot sport cluster 406 and aids the user in understanding his or her current location relative to a hot spot 404 and a hot spot cluster 406.

FIG. 4E illustrates a further zoom-in of the same geographic location. In this map view 402 additional hot spot clusters are shown which dynamically illustrate the location of content posts around relevant hot spots within the current map view. In this example, there is a hot spot 422 which lies just south of the user's current location. The user's current location is identified by the circular bull's eye in the upper right central part of the map view 402. The original hot spot cluster 424 now shows a greater number of localized content posts within its geographic area. This view also shows hot spot cluster 426 and hot spot cluster 420, each of which also surround two independent hot spots. In one embodiment, clustering occurs when two or more content posts have the same tag even though the content post may mark entirely different events or user experiences. The association is established by the similarity in content tags for different posts and each content post can have up to four different tags. A tag for a content post is considered "popular" if it occurs, in one embodiment, more than two times and the higher the popularity the more likely the content posts with the same tags will be clustered together and shown within a circular area defined by a cluster on a map within a particular map view, depending on the geographic coordinates of the map view.

Figure 4F:
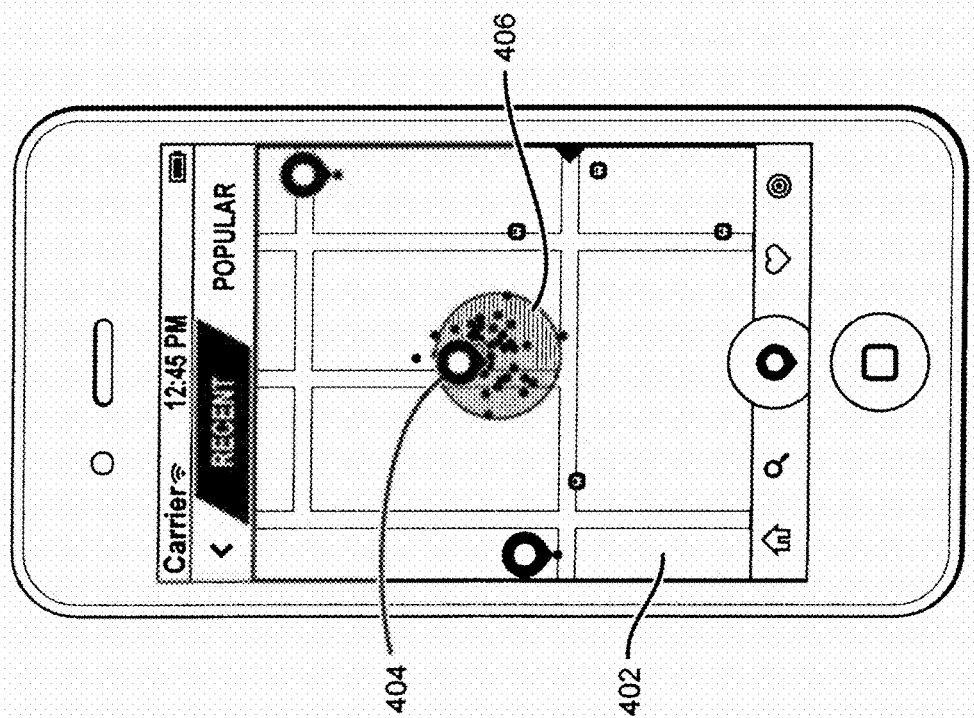

FIG. 4F shows a map view 402 resulting from a zoom-out from the map view shown in FIG. 4E and again shows the original hot spot 404 and the associated hot spot cluster 406 with each content post within the hot spot cluster 406. This figure is intended to show that the dynamically generated "social layer" of content can adjust and scale depending on the map view selected by a user of the mobile application.

Figure 5A:
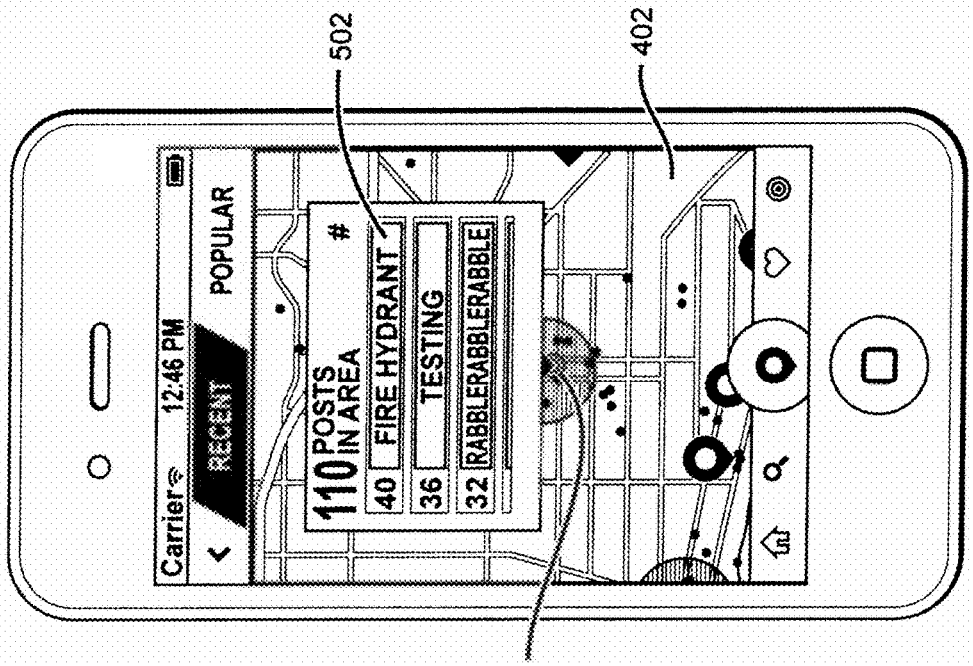
FIG. 5A is a display diagram illustrating a user interface of a mobile application for event notification sharing in an embodiment.

FIG. 5A is an illustration of the listing of tags assigned by users for all content posts within a selective hot spot cluster. By clicking on the user's current location 418, a small screen will appear that lists all content tags in the geographic area covered by the hot spot cluster. In this example embodiment, a total of 110 content posts are in the geographic area covered by the hot spot cluster. Forty (40) of the tags are similar for the posts in this geographic area and have been tagged with the term "FIRE HYDRANT" 502. Additionally, there are 36 tags with the term "TESTING" and 32 tags with the term "RABBLE-RABBLE-RABBLE."

Figure 5C:
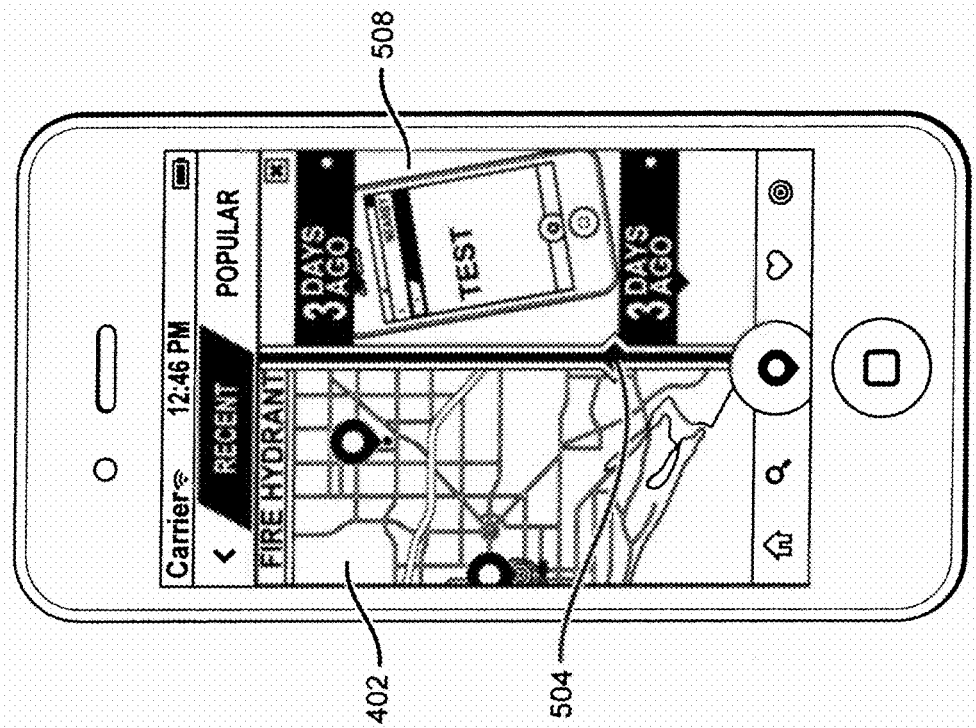
FIG. 5C is a display diagram illustrating a user interface of a mobile application for event notification sharing in an embodiment.
Figure 5B:
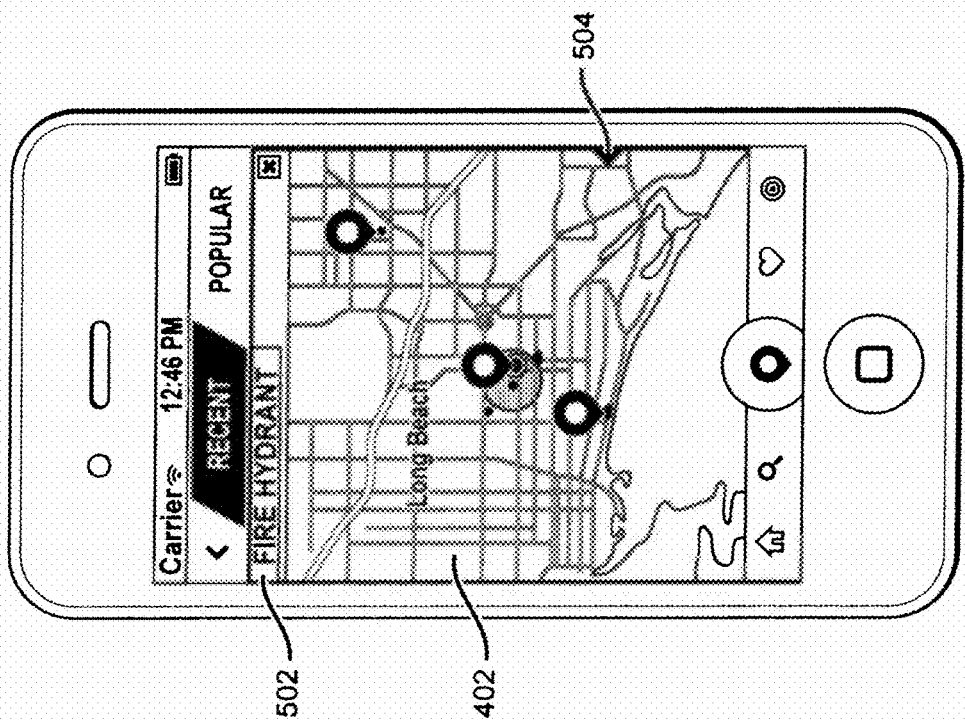
FIG. 5B is a display diagram illustrating a user interface of a mobile application for event notification sharing in an embodiment.

FIG. 5B is an illustration of the location of the content post having the same tag for the selected map view 402. The tag 502 in this example is "FIRE HYDRANT" and is shown in this map view for a user. All content posts having this tag are shown on the geographic map which corresponds to the user's map view. These posts are represented by the distinct dots on the geographic map.

FIG. 5C illustrates how a user can transition from a map view 402 to a listing of the content having the same tag, which in this example is "FIRE HYDRANT." The list of content 508 appears once a user selects and moves the tab 504 on the user interface from right to left to move the map view off of the user interface.

Figure 5D:
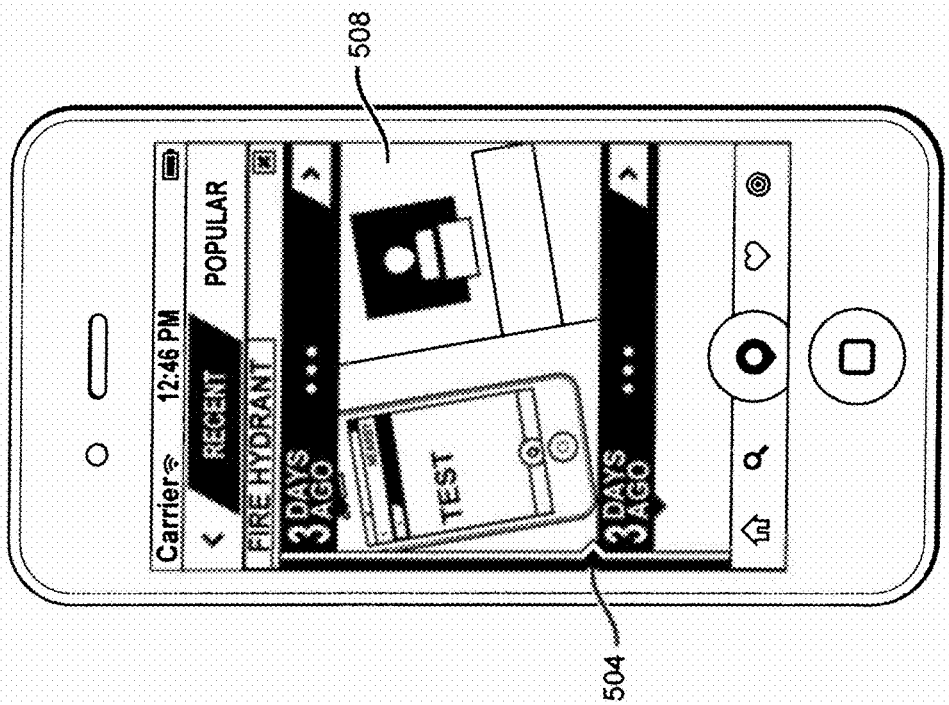
FIG. 5D is a display diagram illustrating a user interface of a mobile application for event notification sharing in an embodiment.

FIG. 5D shows the user interface after a user has fully moved a map view from the user interface and fully lists all content 508 having the same tag "FIRE HYDRANT." In this embodiment, the tab 504 for moving the map view and the list of content posts is now shown on the left side of the user interface.

Figure 6A:
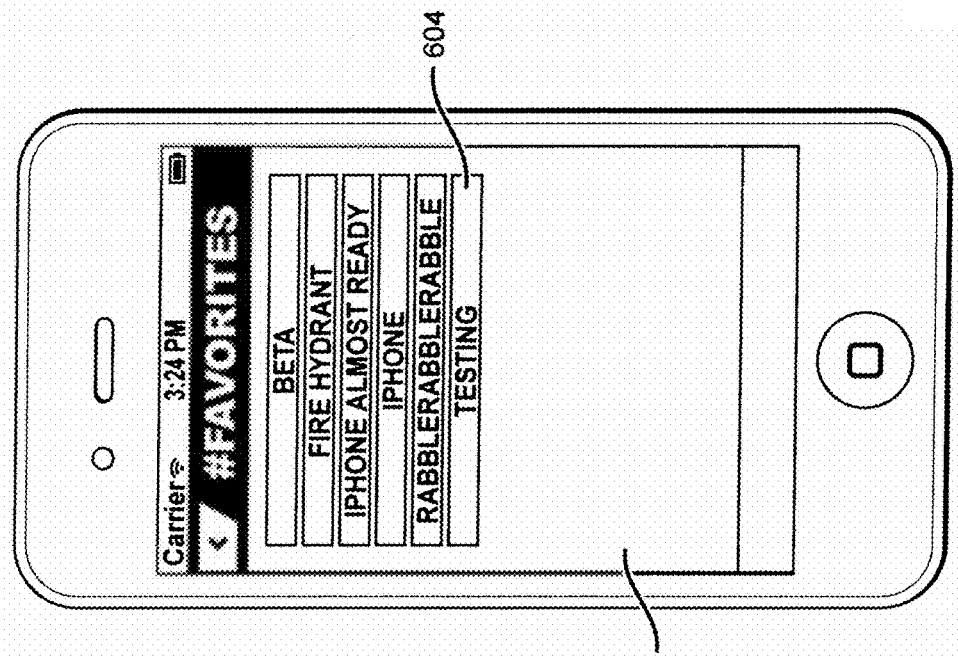
FIG. 6A is a display diagram illustrating a user interface of a mobile application for event notification sharing in an embodiment.

FIG. 6A is an example embodiment of a user interface 602 which appears after clicking on the favorites function 308 as shown on the home screen in FIG. 3. In this example a user has several favorite tags available for use in marking content posts. As shown on this user interface 602, one of the tags includes the term "TESTING" 604. After clicking on the tag 604, a map view 606 is displayed on the user interface, as shown in FIG. 6B. This current map view 606 shows all hot spots including content posts with tags having the term "TESTING." This map view also shows applicable hot spot clusters associated with each hot spot in the current map view 606.

Figure 6C:
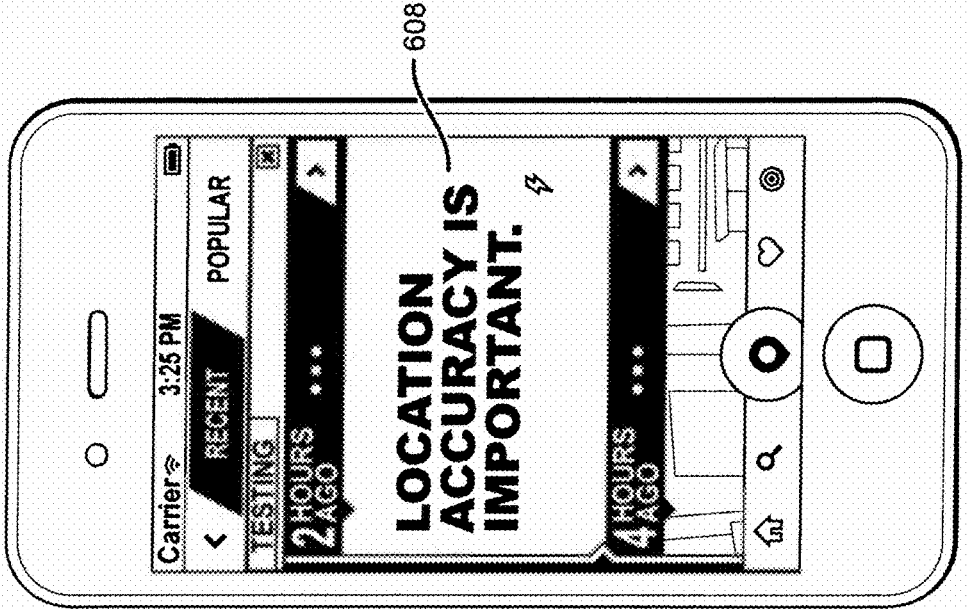
FIG. 6C is a display diagram illustrating a user interface of a mobile application for event notification sharing in an embodiment.
Figure 6B:
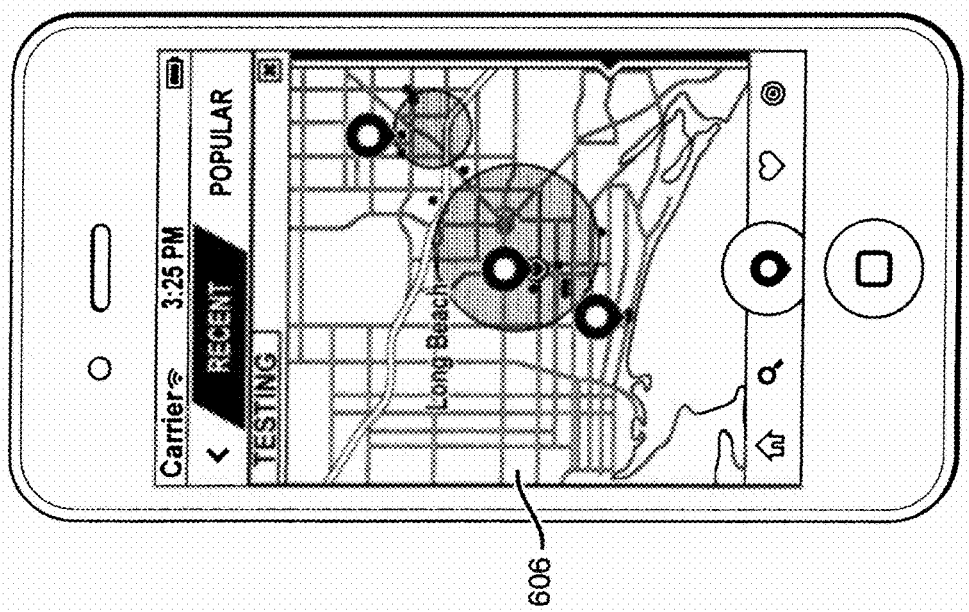
FIG. 6B is a display diagram illustrating a user interface of a mobile application for event notification sharing in an embodiment.

FIG. 6C is a listing of the content from the posts shown in the map view 606 having the tag "TESTING." In this example, the first post is the text message "LOCATION ACCURACY IS IMPORTANT." The second content post is a photo.

Figure 7B:
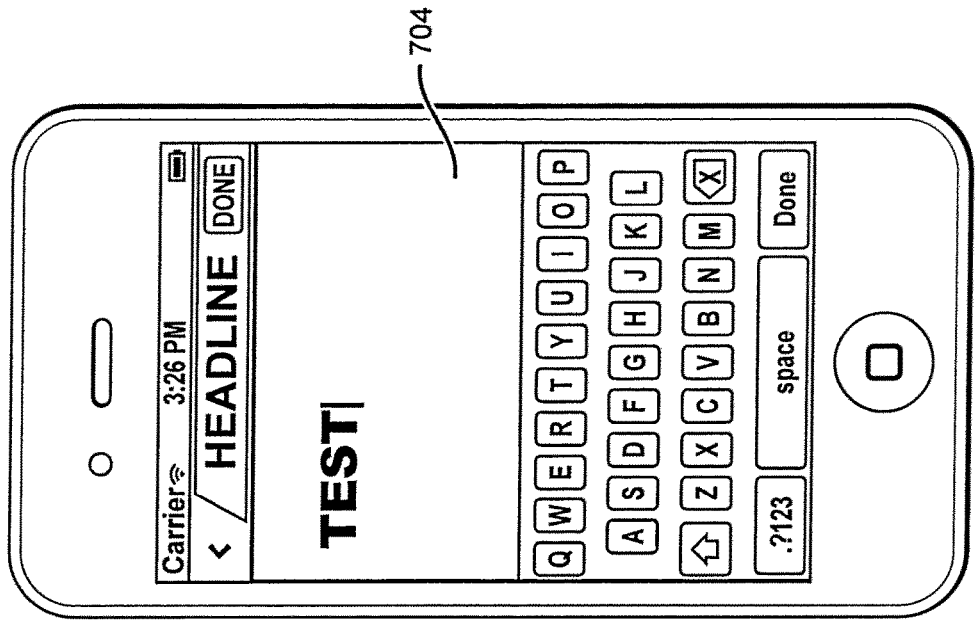
FIG. 7B is a display diagram illustrating a user interface of a mobile application for event notification sharing in an embodiment.
Figure 7A:
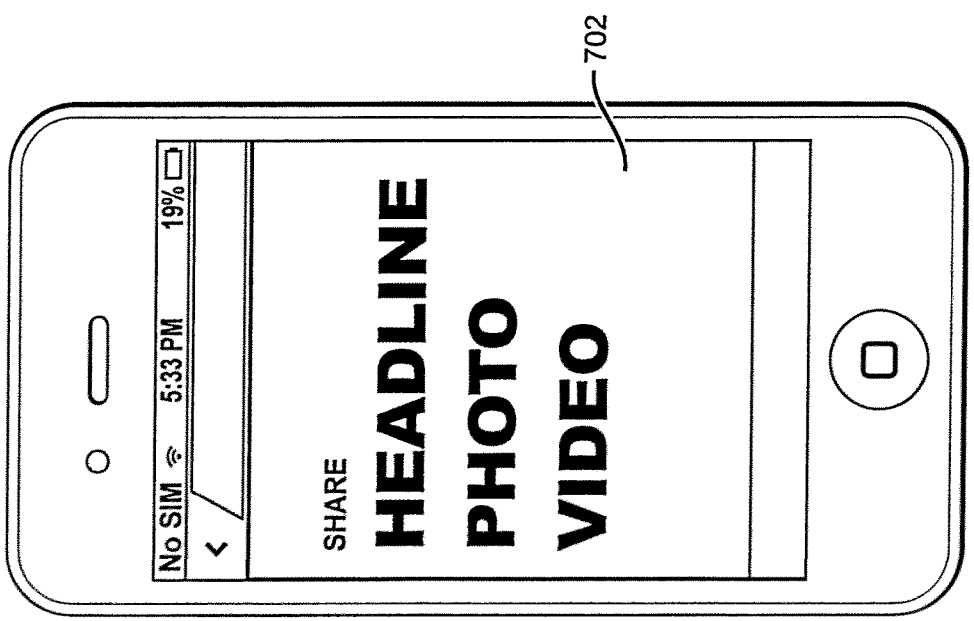
FIG. 7A is a display diagram illustrating a user interface of a mobile application for event notification sharing in an embodiment.

FIG. 7A shows a user interface 702 in an embodiment which appears after clicking on the "Capture" function 310, as shown in FIG. 3. In this example, three distinct categories of content are shown, "HEADLINE", "PHOTO" and "VIDEO." This user interface 702 helps users to categorize captured content by type so that it can be quickly tagged and posted onto a geographic map. In this example, the content category selected by the user is "HEADLINE" which generally represents textual content and, as shown in FIG. 7B, the user then enters text input as the textual content. In practice, the text input may be a description of a user's experience or a description of an event the user is currently experiencing or viewing. The user interface 704 in this embodiment includes a digital keyboard for entry of text content.

Figure 7D:
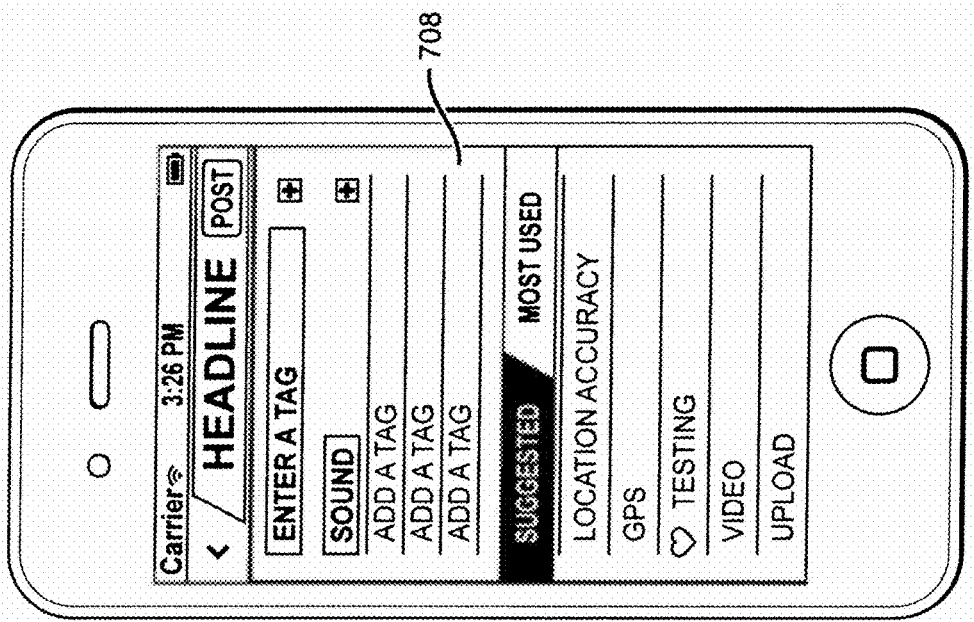
FIG. 7D is a display diagram illustrating a user interface of a mobile application for event notification sharing in an embodiment.
Figure 7C:
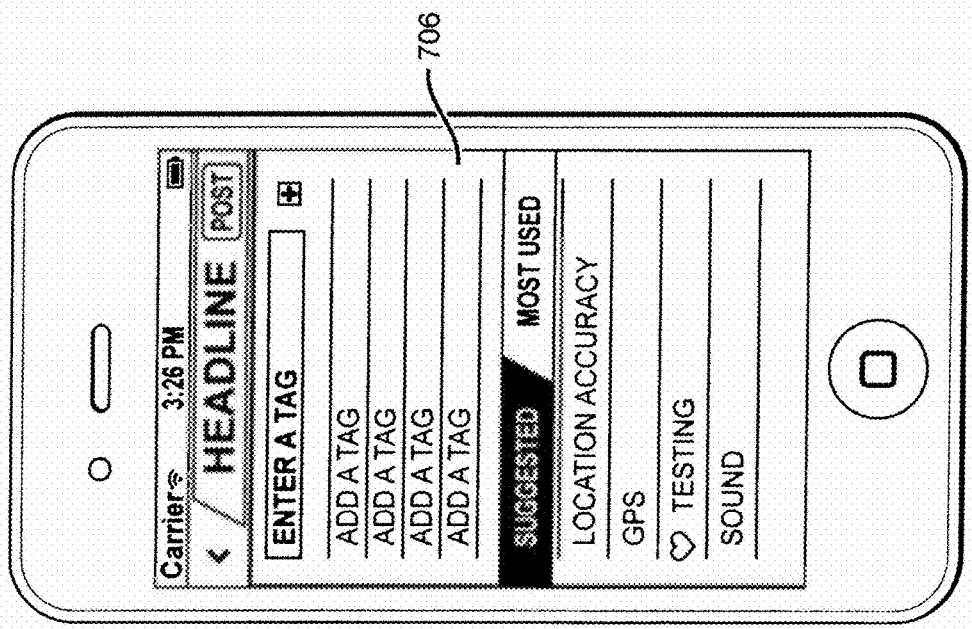
FIG. 7C is a display diagram illustrating a user interface of a mobile application for event notification sharing in an embodiment.

FIG. 7C illustrates a user interface 706 in an embodiment which now presents the user with a field for entering a tag to mark the content that has been entered. In one embodiment, up to four (4) distinct and different tags can be used to mark a single content post. The user interface 706 also illustrates an embodiment of a suggestion tool that suggests tags for content regardless of the type of content (i.e., text, photo or video). In this example, the application suggests the tags "LOCATION ACCURACY", "GBS", "TESTING" and "SOUND". The heart-shaped figure next to the tag "TESTING" is used to identify that term as one of the user's favorites as stored in this application.

FIG. 7D shows a user selecting one of the suggested tag terms for the current content. The user in this example selects the term "SOUND". After a user selects the first tag for the post, the application displays an updated list of suggested tags. In this example, the term "UPLOAD" is a new suggested tag which is generated by the application and it appears in the list of suggested tags in the lower portion of the user interface 708. Suggested tags are generated from the list of tags, which are stored and associated with previously stored content in the Database 112. In some embodiments, contemplated generated lists are also pulled or downloaded based on the user's current location. So, for example, if they are in Long Beach at location XYZ and another user posted content within the same XYZ location range, we will suggest those tags. This process makes it easier for someone attending the same event to label their post without having to type it out.

Figure 7F:
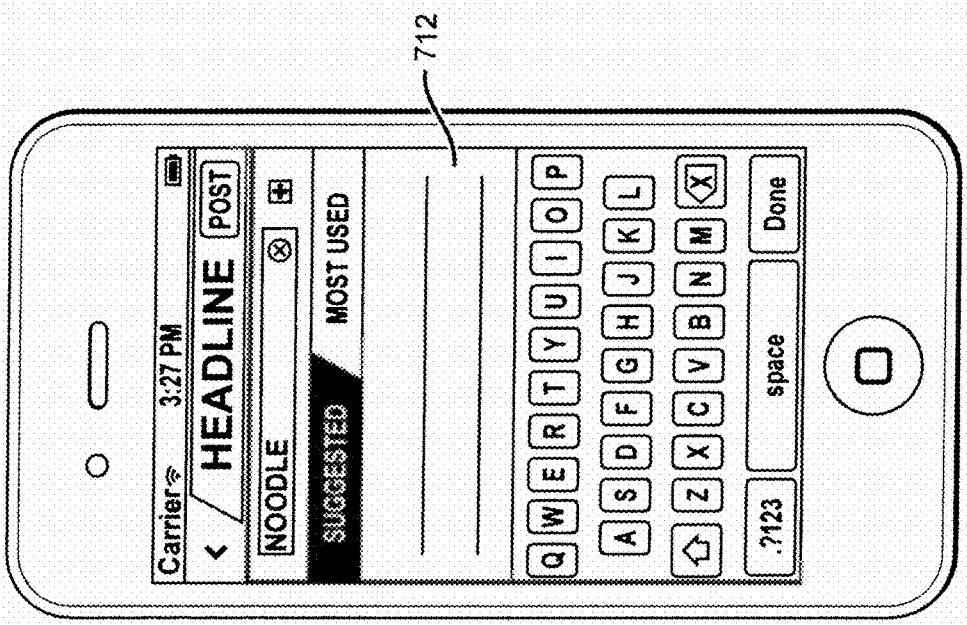
FIG. 7F is a display diagram illustrating a user interface of a mobile application for event notification sharing in an embodiment.
Figure 7E:
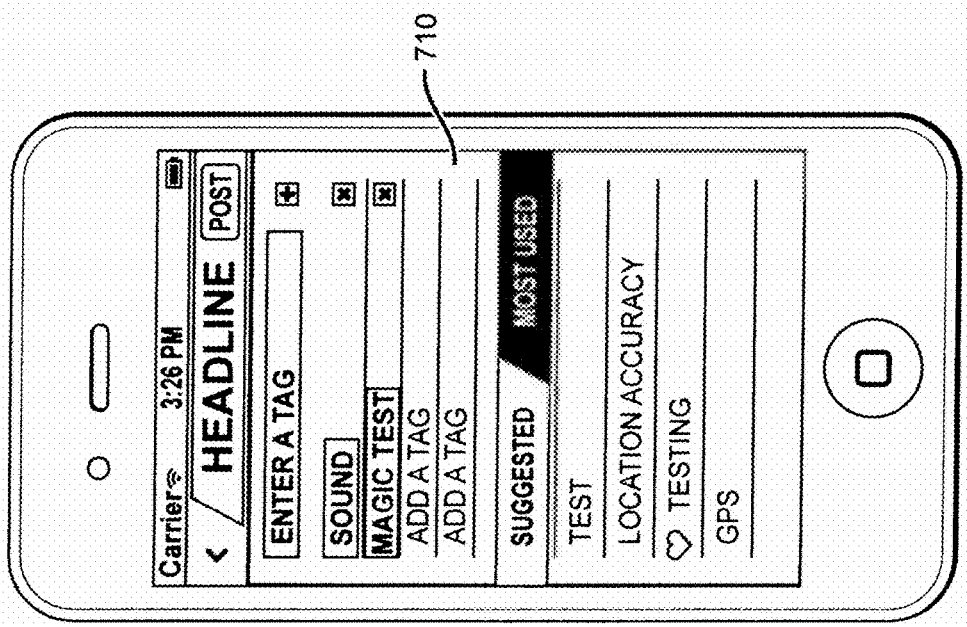
FIG. 7E is a display diagram illustrating a user interface of a mobile application for event notification sharing in an embodiment.

FIG. 7E illustrates a user interface 710 with two tags entered by a user of the mobile application for association with the text content which was entered in the application and shown on user interface 704 in FIG. 7B (i.e., the word "TEXT"). The user interface 710 identifies for the user the most used tags which have been stored and associated with this user's content postings and stored in the Database 112. As shown in this figure, the most used tags include the tags "TEST," "LOCATION ACCURACY," "TESTING," and "GPS." This figure also shows that the user has selected a second tag for the same content post, which in this case is the phrase "MAGIC TEST."

The user interface 712 shown in FIG. 7F illustrates how a user would type or manually enter a tag for a content post. In this embodiment, the user interface 712 displays a digital keyboard for use in manually entering a tag for association with the text content.

Figure 7G:
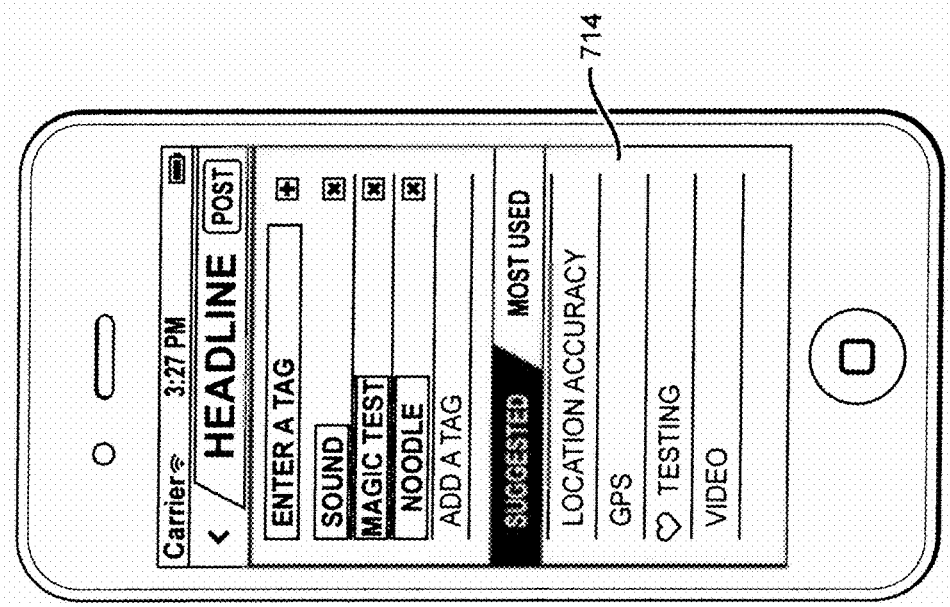
FIG. 7G is a display diagram illustrating a user interface of a mobile application for event notification sharing in an embodiment.

FIG. 7G illustrates a user interface 714 listing three tags which have been selected and associated with the textual content which was been entered by the user, as shown previously in FIG. 7B. The user interface 714 includes a current listing of suggested tags in the lower portion of the user interface (i.e., "LOCATION ACCURACY", "GPS", "TESTING" and "VIDEO"). After the user completes the selection or entry of tags, the user can then expressly post the content for display in a map view so all users using the mobile application who are in the same general proximity of the event or experience about which the current user has chosen to post can view the content associated with the post. The posting in the user interface will be represented in graphical form as a dot on a user's selected map view and the posting will have associated with it the three tags which were selected or manually entered by the user, all of which in the present example will serve to mark the text content "TEST" for this posting.

Figure 8:
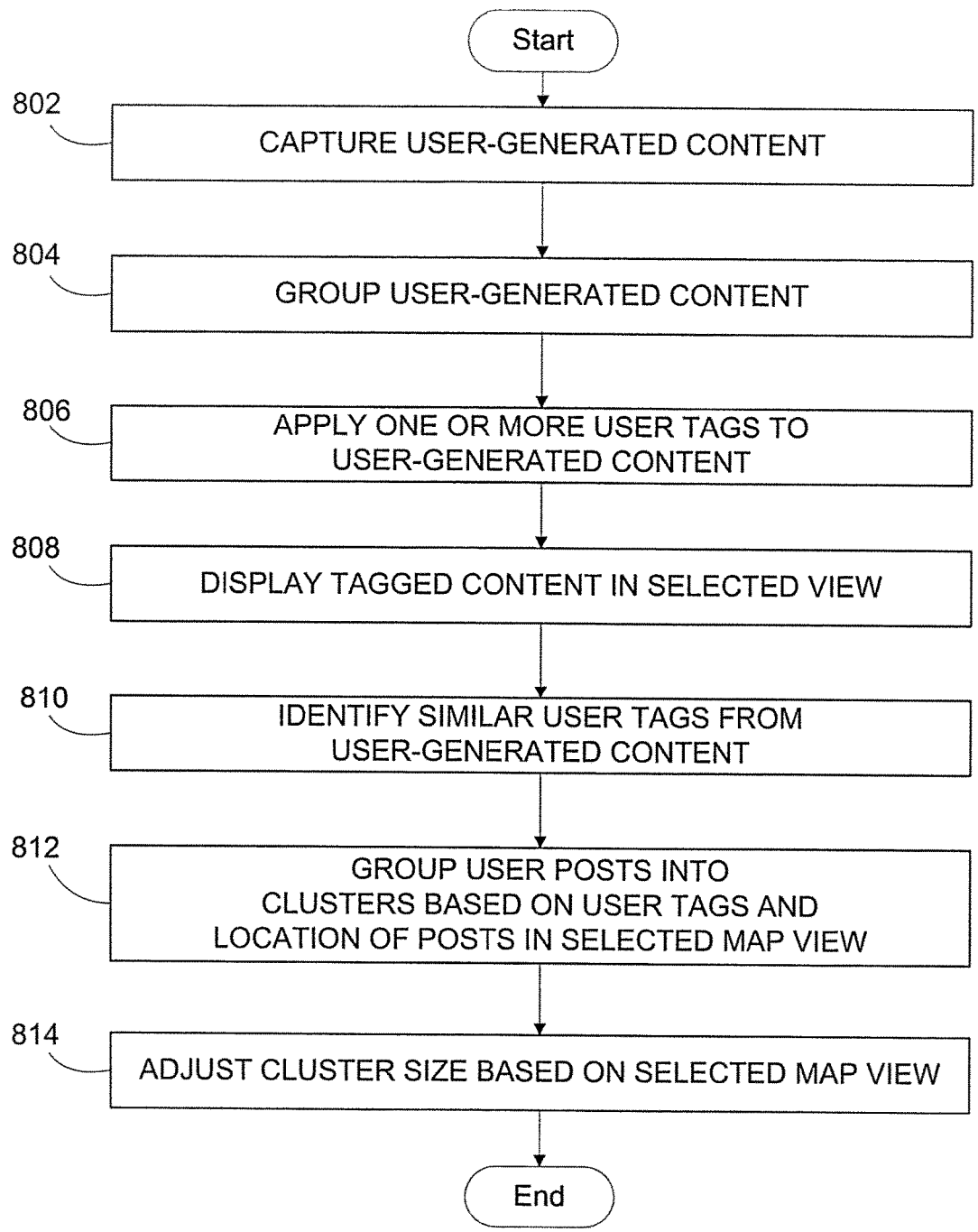
FIG. 8 is a flowchart illustrating a method of crowdsourced event notification sharing in an embodiment.

FIG. 8 is an illustration of a flow chart representing a contemplated computer implemented method performed by a mobile application for capturing, grouping, clustering and dynamically adjusting posts for shared event notifications among users of the mobile application. This method begins with the capturing of user-generated content, as shown at step 802, which content includes text content (i.e., text messages, etc.), photo content or video content. After capturing the content, the next step in the method involves grouping the user-generated content, as shown at step 804. Content can be grouped by as text content, photo content or video content, or by any other meaningful content category selected by a user and made available in the application. After grouping, one or more user tags are applied to the user-generated content to document significant user events and/or experiences. In one embodiment, the tags are user-generated and entered into the mobile application manually. In an alternative embodiment, the user tags are computer-generated and suggested to the user for selection and association with the user-generated content that has been captured and grouped, as shown at step 806.

After the content is tagged, a post representing the content will be displayed in a selected view on the user interface implemented by the mobile application on a mobile device 104, 106, 108, as shown at step 808. In one embodiment, a user can select view from either a "map view" or a "listing view." The map view displays the post on a geographic map and the post may be included with additional posts within a geographic area that is proximate to the current post in order to provide the user and other users who are in the same general geographic area with a graphical representation of postings in a defined geographic area based on their respective selected map views. The number and type of posts in any given geographic area may differ depending on the selected map view. However, posts will be clustered in a "hot spot cluster" if any two or more posts have the same tag for content within the geographic area represented by a hot spot cluster for a given map view. In one embodiment, content posts may have up to four different tags that can be assigned by users to share events and experiences that are noteworthy.

In another embodiment, tagged content posts can be displayed in a list view which will allow end users to view all content in a given hot spot cluster as a list. The list view is an alternative display of content and allows a user to view the content that has been posted to a geographic map view as a list of the actual content posted (e.g., text content, photo content, video content). For instance, a user may view the complete listing of text content, photos and videos that all users have posted regarding events or experiences they have had in a geographic area covered by a hot spot cluster.

After tagging content, the user tags will be evaluated and content posts will be clustered based on the identification of similar tags for various content posts. Similar events may be identified from identical user tags. In the event, there are two or more content posts having the same tags in the same general geographic area relative to a user's current map view, then all such postings will be clustered together and shown in a hot spot cluster on a user interface for the mobile application, as shown as step 810.

After evaluation of tags and the identification of similar tags for content posts within the same relative geographic area, a cluster generation engine hosted and executing on a web server will perform a grouping of user posts into clusters, as shown at step 812. In one embodiment, content posts within (1) geographic mile of each other will be grouped for clustering purposes. The size of each cluster into which content posts are clustered will be adjusted as necessary based on a user's selected map view, as shown at step 814. For example, as a user zooms closer into a specific geographic location, a cluster representing one large coverage area in a first user interface view may ultimately be represented by four or more clusters of content posts as the user's map view changes while zooming closer into a particular geographic region.

Likewise, as the user zooms out or further from a point of geographic interest to a wider area of review, then cluster sizes will be adjusted and smaller clusters will be subsumed into larger clusters and the size of the remaining clusters will be adjusted to account for the differences in map view and relative geographic coverage. After adjustment of cluster size based on a user's selected map view, the process of capturing, categorizing and clustering of content posts will be complete. In this manner, the mobile application and the back-end processing provided in support of the mobile application on one or more servers will implement and overlay a "social layer" of content on a geographic map.

The features described can be implemented in digital electronic circuitry, or in computer hardware, firmware, software, or in combinations of them. The features can be implemented in a computer program product tangibly embodied in an information carrier, e.g., in a machine-readable storage device or in a composition of matter capable of effecting a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a standalone program or as a module, component, subroutine, or other unit suitable for use in a computing environment.

Suitable processors for the execution of a program of instructions include, by way of example, both general and special purpose microprocessors, and a sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of examples semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (Application-Specific Integrated Circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet. The computer system can include clients and servers. A client and server are generally remote from each other and typically interact through a network. The relationship of client and server arises by virtue of computer programs running on the respective computers and having a client-server relationship to each other.

Thus, specific embodiments of electronic information processing, and in particular but not exclusively, relates to a user interacting with a user interface, along with methods and systems for actively capturing and intelligently categorizing multimedia informational content from users of mobile devices pertaining to their interactions with events and experiences and for displaying postings pertaining to these events and experiences in mapped geographic locations on the user interface of a mobile application executing on the mobile devices have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. An accessible user interface application for crowd-sourced notification and sharing of events, comprising:
    at least one piece of multimedia information content that is related to an at least one event, experience or combination thereof,
    at least one user-defined geographical location that is related to the at least one event, experience or combination thereof, wherein the at least one piece of multimedia information content and the at least one user-defined geographical location are collected by the accessible user interface application to form an event notification;
    at least two event notifications, wherein the at least two event notifications are collectively a group of shared event notifications, wherein the group of shared event notifications are dynamically and continually adjusted as additional event notifications are captured;
    a crowd sourced social layer map that comprises at least one hot spot, wherein the map is initially formed and updated dynamically and continually from the group of shared event notifications, wherein the crowd-sourced social map includes photo content, video content, or a combination thereof; and
    a mobile device, wherein the accessible user interface is stored on, located on, shown by, accessed by the user from or a combination thereof, wherein the accessible user interface is accessed by the user on the mobile device to create an event notification, access the crowd sourced social map or a combination thereof.

2. The application of claim 1, wherein the at least one piece of multimedia information content comprises event information, experience information or a combination thereof.

3. The application of claim 1, wherein the at least one piece of multimedia information content can be viewed by at least one additional person other than the user.

4. The application of claim 1, wherein the accessible user interface application is also communicatively connected to a public network, the internet, at least one database server, at least one web server or a combination thereof.

5. The application of claim 1, wherein the mobile device comprises a handheld device, a smartphone, a tablet device, a laptop, a cell phone, an internet glasses device, an internet wrist device or a combination thereof.

6. The application of claim 1, wherein the mobile device comprises a memory interface, at least one data processor, at least one image processor, at least one central processing unit, at least one peripherals interface or a combination thereof.

7. The application of claim 6, wherein the memory interface, at least one data processor, at least one image processor, at least one central processing unit, at least one peripherals interface or a combination thereof are integrated into at least one integrated circuit.

8. The application of claim 1, wherein the mobile device comprises a GPS signal receiver, a camera subsystem or a combination thereof.

9. The application of claim 1, wherein the mobile device comprises a communications subsystem, an audio subsystem or a combination thereof.

10. The application of claim 1, wherein the accessible user interface application comprises a cluster generation engine.

11. The application of claim 10, wherein the cluster generation engine evaluates the latitudinal and longitudinal geographic location of at least one content post and clusters the at least one content post together within a given geographic proximity.

12. The application of claim 11, wherein at least one of the content post is tagged with at least one associated tag.

13. The application of claim 12, wherein the content posts and their associated tags are made available for display to at least one user of the application on the mobile device.

14. The application of claim 13, wherein the user interface application dynamically adjusts the clustering of content posts depending on the map view selected by a user of the application.

15. A method of using accessible user interface for crowdsourced notification and sharing of events, comprising:
having at least one event, experience or combination thereof, wherein the at least one event, experience or combination thereof is attended by at least one person,
providing at least one piece of multimedia information content that is related to an at least one event, experience or combination thereof,
providing at least one user-defined geographical location that is related to the at least one event, experience or combination thereof, wherein the at least one piece of multimedia information content and the at least one user-defined geographical location are collected by the accessible user interface application to form an event notification;
capturing at least two event notifications, wherein the at least two event notifications are collectively a group of shared event notifications, wherein the group of shared event notifications are dynamically and continually adjusted as additional event notifications are captured;
developing a crowd sourced social layer map that comprises at least one hot spot, wherein the map is initially formed and updated dynamically and continually from the group of shared event notifications, wherein the crowd-sourced social map includes photo content, video content, or a combination thereof; and
providing a mobile device, wherein the accessible user interface is stored, located, shown, accessed by the user from or a combination thereof; and
utilizing the mobile device to access the accessible user interface, wherein the accessible user interface is accessed by the user on the mobile device to create an event notification, access the crowd sourced social map or a combination thereof.

16. The method of claim 15, wherein the at least one piece of multimedia information content comprises event information, experience information or a combination thereof.

17. The method of claim 15, wherein the at least one piece of multimedia information content can be viewed by at least one additional person other than the user.

18. The method of claim 15, wherein the accessible user interface application is also communicatively connected to a public network, the internet, at least one database server, at least one web server or a combination thereof.

19. The method of claim 15, wherein the mobile device comprises a handheld device, a smartphone, a tablet device, a laptop, a cell phone, an internet glasses device, an internet wrist device or a combination thereof.

20. A system for utilizing an executable accessible user interface application for crowdsourced notification and sharing of events, comprising:
at least one piece of multimedia information content that is related to an at least one event, experience or combination thereof,
at least one user-defined geographical location that is related to the at least one event, experience or combination thereof, wherein the at least one piece of multimedia information content and the at least one user-defined geographical location are collected by the accessible user interface application to form an event notification;
at least two event notifications, wherein the at least two event notifications are collectively a group of shared event notifications, wherein the group of shared event notifications are dynamically and continually adjusted as additional event notifications are captured;
a crowd sourced social layer map that comprises at least one hot spot, wherein the map is initially formed and updated dynamically and continually from the group of shared event notifications, wherein the crowd-sourced social map includes photo content, video content, or a combination thereof; and
a mobile device having at least one storage medium, wherein the accessible user interface is stored on the storage medium, located on the storage medium, shown by the mobile device, accessed by the user from the storage medium or a combination thereof.

* * * * *